United States Patent [19]
Kahle et al.

[11] Patent Number: 5,995,743
[45] Date of Patent: Nov. 30, 1999

[54] METHOD AND SYSTEM FOR INTERRUPT HANDLING DURING EMULATION IN A DATA PROCESSING SYSTEM

[75] Inventors: James Allan Kahle; Soummya Mallick, both of Austin, Tex.

[73] Assignee: International Business Machines Corporation, Armonk, N.Y.

[21] Appl. No.: 08/935,007

[22] Filed: Sep. 22, 1997

[51] Int. Cl.$^6$ .................................................. G06F 9/44
[52] U.S. Cl. ..................... 395/500.42; 395/733
[58] Field of Search ................................ 395/500, 385, 395/568, 376; 770/15

[56] References Cited

U.S. PATENT DOCUMENTS

| | | | |
|---|---|---|---|
| 4,779,188 | 10/1988 | Gum et al. | 395/500 |
| 5,276,815 | 1/1994 | Nakashima et al. | 710/15 |
| 5,574,874 | 11/1996 | Jones et al. | 395/376 |
| 5,623,617 | 4/1997 | Davidian | 395/568 |
| 5,732,235 | 3/1998 | Kahle et al. | 395/385 |
| 5,812,823 | 9/1998 | Kahle et al. | 395/500 |
| 5,870,575 | 2/1999 | Kahle et al. | 395/385 |

OTHER PUBLICATIONS

Deltchev et al., *Design Investigation of Microprogrammable Emulator Architecture in Distributed Computer Systems*, Mar. 1992, pp. 157–162.

Mersten, *Microprocessors Applied to Minicomputers*, Apr. 1979, pp. 321–326.

Covington et al., *Cross–Profiling as an Efficient Technique in Simulating Parallel Computer Systems*, Jul. 1989, pp. 75–80.

*Primary Examiner*—Kevin J. Teska
*Assistant Examiner*—Dan Fiul
*Attorney, Agent, or Firm*—Casimer K. Salys; Brian F. Russell; Andrew J. Dillon

[57] ABSTRACT

A processor and method of interrupt handling in a processor which has a native instruction set and emulates guest instructions within a guest instruction set are described. According to the method, in response to occurrence of an interrupt during emulation of a current guest instruction, an indication of a location in memory of the current guest instruction, an indication of a location in memory of a next guest instruction to be emulated, and an indication of a particular native instruction are stored. After an interrupt handler is executed, emulation is resumed by executing native instructions beginning with the particular native instruction. In response to execution of a native instruction of a first type before execution of a native instruction of a second type, the current guest instruction is fetched from memory. In response to execution of a native instruction of the second type before execution of a native instruction of the first type, the next guest instruction is fetched from memory without fetching the current guest instruction.

8 Claims, 4 Drawing Sheets

METHOD AND SYSTEM FOR INTERRUPT HANDLING DURING EMULATION IN A DATA PROCESSING SYSTEM

CROSS-REFERENCE TO RELATED APPLICATIONS

The subject matter of this application is related to that disclosed in the following applications, which are assigned to the assignee of the present application and are incorporated herein by reference:

Ser. No. 08/934,645, filed of even date herewith, for ADDRESS TRANSLATION BUFFER FOR DATA PROCESSING SYSTEM EMULATION MODE, by Soummya Mallick.

Ser. No. 08/934,644, filed of even date herewith, for INDIRECT UNCONDITIONAL BRANCHES IN DATA PROCESSING SYSTEM EMULATION MODE, by James A. Kahle and Soummya Mallick.

Ser. No. 08/934,857, filed of even date herewith, for METHOD AND SYSTEM FOR PROCESSING BRANCH INSTRUCTIONS DURING EMULATION IN A DATA PROCESSING SYSTEM, by James A. Kahle and Soummya Mallick.

Ser. No. 08/591,291, filed Jan. 25, 1996, for A METHOD AND SYSTEM FOR MINIMIZING THE NUMBER OF CYCLES REQUIRED TO EXECUTE SEMANTIC ROUTINES, by Soummya Mallick.

Ser. No. 08/581,793, filed Jan. 25, 1996, for A METHOD AND SYSTEM FOR IMPROVING EMULATION PERFORMANCE BY PROVIDING INSTRUCTIONS THAT OPERATE ON SPECIAL-PURPOSE REGISTER CONTENTS, by Soummya Mallick.

BACKGROUND OF THE INVENTION

1. Technical Field

The present invention relates in general to a method and system for data processing and, in particular, to a method and system for emulating differing architectures in a data processing system. Still more particularly, the present invention relates to a method and system for interrupt handling during emulation of guest instructions in a data processing system.

2. Description of the Related Art

The PowerPC™ architecture is a high-performance reduced instruction set (RISC) processor architecture that provides a definition of the instruction set, registers, addressing modes, and the like, for a family of computer systems. The PowerPC™ architecture is somewhat independent of the particular construction of the microprocessor chips or chips utilized to implement an instance of the architecture and has accordingly been constructed in various implementations, including the PowerPC 601™, 602™, 603™, and 604™. The design and operation of these processors have been described in published manuals such as the *PowerPC 604™ RISC Microprocessor User's Manual*, which is available from IBM Microelectronics as Order No. MPR604UMU-01 and is incorporated herein by reference.

As is true for many contemporary processors, a RISC architecture was chosen for the PowerPC™ because of the inherently higher performance potential of RISC architectures compared to CISC (complex instruction set computer) architectures. While it is desirable to optimize the design of a RISC processor to maximize the performance of the processor when executing native RISC instructions, it is also desirable to promote compatibility by accommodating commercial software written for CISC processors such as the Intel x86 and Motorola 68K.

Accordingly, an emulator mechanism can be incorporated into a PowerPC™ processor as disclosed in above-referenced Ser. Nos. 08/591,291 and 08/581,793. The disclosed emulation mechanism allows guest instructions (e.g., variable-length CISC instructions) to be emulated by executing corresponding semantic routines formed from native RISC instructions. Thus, the processor is required to manage two distinct instruction streams: a guest instruction stream containing the instructions to be emulated and a native instruction stream containing the native instructions within the semantic routines utilized to emulate the guest instructions. In order to maintain high performance when emulating guest instructions, an efficient mechanism is needed within the processor for managing both the guest and native instruction steams, with provision for branching and exception handling.

SUMMARY OF THE INVENTION

It is therefore one object of the present invention to provide an improved method and system for data processing.

It is another object of the present invention to provide a method and system for a method and system for emulating differing architectures in a data processing system.

It is yet another object of the present invention to provide a method and system for interrupt handling during emulation of instructions in a data processing system.

The foregoing objects are achieved as is now described. According to one embodiment, an emulation mechanism for a host computer system allows guest instructions to be executed by semantic routines made up of native instructions. The native instructions for the host processor are of a particular format, such as that specified by a RISC architecture, whereas the guest instructions are in a format for a different computer architecture, such as variable-length CISC instructions. The processor includes an emulator unit for fetching and processing the guest instructions that utilizes a multiple-entry pointer queue to store the guest instructions currently fetched in order of receipt. Each entry in the pointer queue includes an offset that indicates the location in memory of the semantic routine for the associated guest instruction, immediate data (if any) for the guest instruction, the length of the corresponding semantic routine, a condition field indicating results of arithmetic/logic operations by a guest instruction, valid bits, and other pertinent data. The processor executes a semantic routine, in response to the entries in the pointer queue, using the content of the entry to fetch the semantic routine. An entry is removed from the pointer queue when the semantic routine for the associated guest instruction has been completed by the processor.

In response to occurrence of an interrupt during emulation of a current guest instruction, an indication of a location in memory of the current guest instruction, an indication of a location in memory of a next guest instruction to be emulated, and an indication of a particular native instruction are stored. After an interrupt handler is executed, emulation is resumed by executing native instructions beginning with the particular native instruction. In response to execution of a native instruction of a first type before execution of a native instruction of a second type, the current guest instruction is fetched from memory. In response to execution of a native instruction of the second type before execution of a native instruction of the first type, the next guest instruction is fetched from memory without fetching the current guest instruction.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
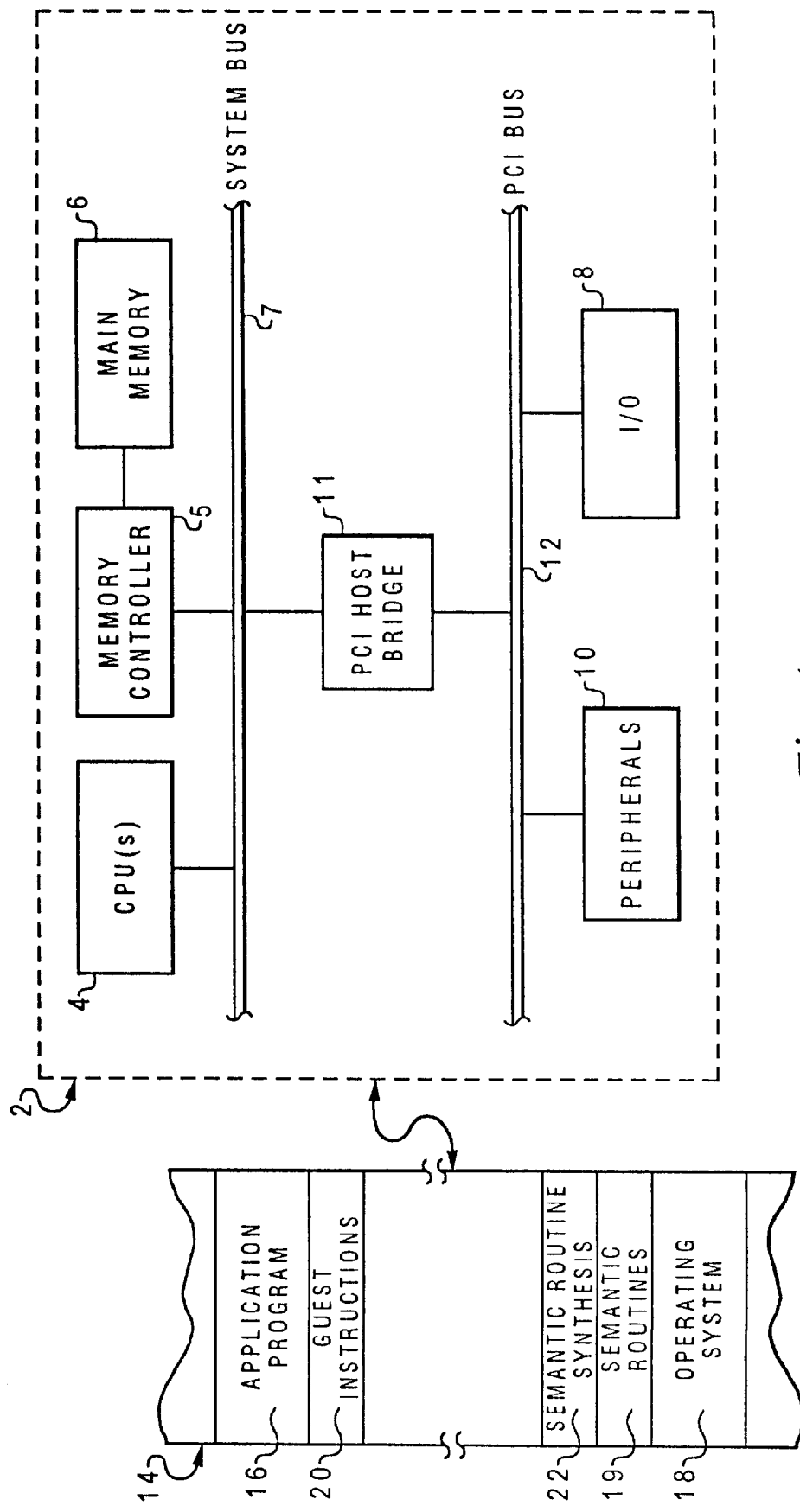
FIG. 1 depicts an illustrative embodiment of a data processing system with which the method and system of the present invention may advantageously be utilized.

With reference now to the figures and in particular with reference to FIG. 1, there is depicted a high level block diagram of a data processing system 2 in accordance with the present invention. As illustrated, data processing system 2, which can comprise a desktop computer system, includes one or more CPUs 4, which are connected to the other components of data processing system 2 in a standard hardware configuration. For example, CPUs 4 can be interconnected to main memory 6 via a memory controller 5 and system bus 7. System bus 7 is also coupled to PCI (Peripheral Component Interconnect) bus 12 by a PCI host bridge 11, which permits communication between the devices coupled to system bus 7 and peripherals 10 and I/O components 8. Although for the purpose of illustration, the present invention is described below with reference to an illustrative embodiment in which CPU 4 is implemented with one of the PowerPC™ line of processors manufactured by International Business Machines Corporation, it should be understood that a variety of other processors could alternatively by employed.

When implemented as a PowerPC™ processor, each CPU 4 preferably comprises a single integrated circuit superscalar microprocessor, including various registers, buffers, execution units, and functional units that operate according to reduced instruction set computing (RISC) techniques. Each CPU 4 executes RISC instructions within the PowerPC™ instruction set architecture (e.g., the instructions forming application program 16 and operating system/kernel 18) from a memory map 14. The PowerPC™ instruction set architecture native to CPU 4 is defined in a number of publications such as *PowerPC™ User Instruction Set Architecture* and *PowerPC™ 603 RISC Microprocessor User's Manual* (Order No. MPR603UMU-01), both available from IBM Microelectronics. RISC instructions, such as those defined by the PowerPC™ instruction set architecture, can be characterized as having a fixed instruction length (e.g., 32-bits), including only register-to-register and register-to-memory operations and not memory-to-memory operations, and being executed without microcoding, often in one machine cycle.

Each CPU 4 is further adapted in accordance with the present invention to execute guest instructions (e.g., CISC instructions or some other instruction set that is not native to CPU 4) by emulation. As described further hereinbelow, guest instructions 20 are each emulated by fetching and executing one or more semantic routines 19, which each contain two or more native instructions. For example, a guest instruction 20 might be a memory-to-memory CISC instruction such as:

ADD MEM1,MEM2,MEM3 meaning "add the contents of memory location #1 to the contents of memory location #2 and store the result in memory location #3." A semantic routine 19 to emulate this guest CISC instruction might contain the following native RISC instructions:

```
LOAD REG1,MEM1
LOAD REG2,MEM2
ADD REG3,REG2,REG1
STORE REG3,MEM3
```

This exemplary semantic routine 19 loads the contents of memory locations #1 and #2 into registers #1 and #2, respectively, adds the contents of registers #1 and #2, stores the result of the addition in register #3, and 5 stores the contents of register #3 to memory location #3. As further illustrated in FIG. 1, memory map 14 preferably further includes semantic routine synthesis code 22, which comprises user level code that can be utilized to synthesize a semantic routine corresponding 10 to a guest instruction if such a semantic routine is not already one of the semantic routines in area 19.

Figure 2:
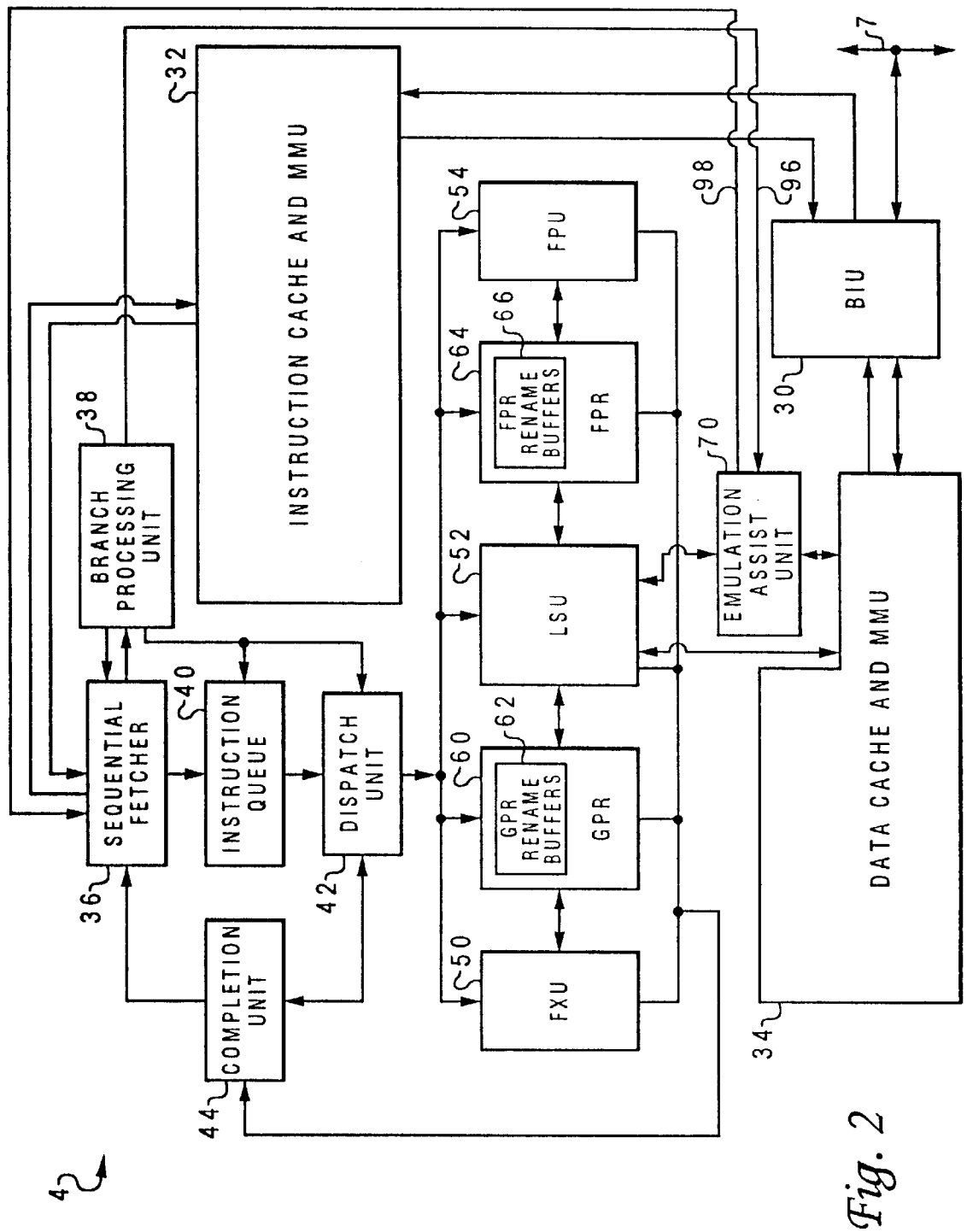
FIG. 2 illustrates a more detailed block diagram of the processor depicted in FIG. 1.

Referring now to FIG. 2, there is illustrated a more detailed block diagram of CPU 4. As depicted, CPU 4 is coupled to system bus 12 via a bus interface unit (BIU) 30 that controls the transfer of information between CPU 4 and other devices that are coupled to system bus 12. BIU 30 is also connected to instruction cache 32 and data cache 34. Both instruction cache 32 and data cache 34 are high-speed caches which enable CPU 4 to achieve a relatively fast access time to instructions and data previously transferred from main memory 6, thus improving the speed of operation of data processing system 2. Instruction cache 32 is further coupled to sequential fetcher 36, which fetches native instructions from instruction cache 32 during each execution cycle. Sequential fetcher 36 transmits branch instructions fetched from instruction cache 32 to branch processing unit (BPU) 38 for execution, but temporarily buffers sequential instructions within instruction queue 40. The sequential instructions stored within instruction queue 40 are subsequently dispatched by dispatch unit 42 to the sequential execution circuitry of CPU 4.

In the depicted illustrative embodiment, the sequential execution circuitry of CPU 4 includes three (or more) execution units, namely, fixed-point unit (FXU) 50, load/store unit (LSU) 52, and floating-point unit (FPU) 54. Each of these three execution units can execute one or more classes of native instructions, and all execution units can operate concurrently during each processor cycle. For example, FXU 50 performs fixed-point mathematical operations such as addition, subtraction, ANDing, ORing, and XORing, utilizing source operands received from specified general purpose registers (GPRs) 60 or GPR rename buffers 62. Following the execution of a fixed-point instruction, FXU 50 outputs the data results of the instruction to GPR rename buffers 62, which provide temporary storage for the data results until the data results are written to at least one of the GPRs 60 during the writeback stage of instruction processing. Similarly, FPU 54 performs floating-point operations, such as floating-point multiplication and division, on source operands received from floating-point registers (FPRs) 64 or FPR rename buffers 66. FPU 54 outputs data resulting from the execution of floating-point instructions to selected FPR rename buffers 66, which temporarily store the data results until the data results are written to selected FPRs 64 during the writeback stage of instruction processing. As its name implies, LSU 52 executes floating-point and fixed-point instructions which either load data from memory (i.e., either data cache 34 or main memory 6) into selected GPRs 60 or FPRs 64 or which store data from a selected one of GPRs 60, GPR rename buffers 62, FPRs 64, or FPR rename buffers 66 to data cache 34 or main memory 6.

CPU 4 employs both pipelining and out-of-order execution of instructions to further improve the performance of its superscalar architecture. Accordingly, multiple instructions can be simultaneously executed by BPU 38, FXU 50, LSU 52, and FPU 54 in any order as long as data dependencies and antidependencies are observed between sequential instructions. In addition, instructions are processed by each of FXU 50, LSU 52, and FPU 54 at a sequence of pipeline stages, including fetch, decode/dispatch, execute, finish and completion/writeback. Those skilled in the art should appreciate, however, that some pipeline stages can be reduced or combined in certain design implementations.

During the fetch stage, sequential fetcher 36 retrieves one or more native instructions associated with one or more memory addresses from instruction cache 32. As noted above, sequential instructions fetched from instruction cache 32 are stored by sequential fetcher 36 within instruction queue 40. In contrast, sequential fetcher 36 removes (folds out) branch instructions from the instruction stream and forwards them to BPU 38 for execution. BPU 38 preferably includes a branch prediction mechanism, which in an illustrative embodiment comprises a dynamic prediction mechanism such as a branch history table, that enables BPU 38 to speculatively execute unresolved conditional branch instructions by predicting whether or not the branch will be taken.

During the decode/dispatch stage, dispatch unit 42 decodes and dispatches one or more native instructions from instruction queue 40 to an appropriate one of sequential execution unit 50, 52, and 54 as dispatch-dependent execution resources become available. These execution resources, which are allocated by dispatch unit 42, include a rename buffer within GPR rename buffers 60 or FPR rename buffers 66 for the data result of each dispatched instruction and an entry in the completion buffer of completion unit 44.

During the execute stage, execution units 50, 52, and 54 execute native instructions received from dispatch unit 42 opportunistically as operands and execution resources for the indicated operations become available. In order to minimize dispatch stalls, each one of the execution units 50, 52, and 54 is preferably equipped with a reservation table that stores dispatched instructions for which operands or execution resources are unavailable.

After the operation indicated by a native instruction has been performed, the data results of the operation are stored by execution units 50, 52, and 54 within either GPR rename buffers 62 or FPR rename buffers 66, depending upon the instruction type. Then, execution units 50, 52, and 54 signal completion unit 44 that the execution unit has finished an instruction. In response to receipt of a finish signal, completion unit 44 marks the completion buffer entry of the instruction specified by the finish signal as complete. Instructions marked as complete thereafter enter the writeback stage, in which instructions results are written to the architected state by transferring the data results from GPR rename buffers 62 to GPRs 60 or FPR rename buffers 66 to FPRs 64, respectively. In order to support precise exception handling, native instructions are written back in program order.

Figure 3:
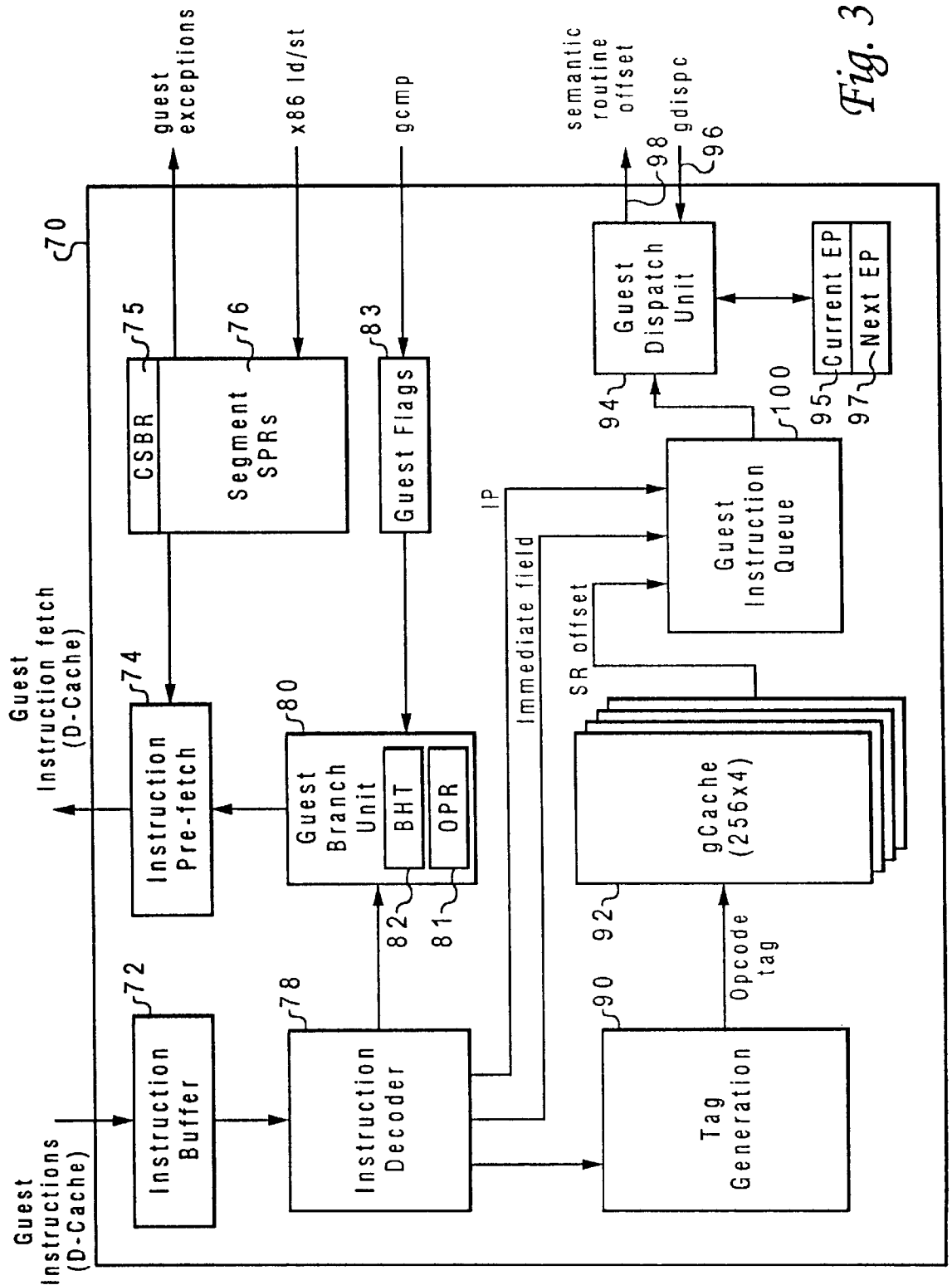
FIG. 3 depicts a more detailed block diagram of the emulation assist unit (EAU) in the processor of FIG. 2.

As illustrated in FIG. 2, in order to facilitate the emulation of guest instructions, CPU 4 includes emulation assist unit (EAU) 70, which is shown in greater detail in FIG. 3. As illustrated in FIG. 3, EAU 70 includes a number of special purpose registers (SPRs) 76 for storing, among other things, the logical base address of segments of guest address space containing guest instructions. SPRs 76 include a code segment base register (CSBR) 75 that stores the base address of the current segment and an offset to the current guest instruction. EAU 70 further includes an instruction prefetch unit 74 for fetching guest instructions from data cache 34 and an instruction buffer 72 for temporarily storing guest instructions retrieved from data cache 34. In addition, EAU 70 includes an instruction decoder 78 for decoding guest instructions, a guest branch unit 80 for executing guest branch instructions, tag generation unit 90, which generates opcode tags for each sequential guest instruction, guest cache 92, which stores a semantic routine (SR) offset in association with each of a plurality of opcode tags, a guest instruction queue 100 for storing information associated with guest instructions, and a guest dispatch unit 94 that provides SR addresses to sequential fetcher 36.

Figure 4:
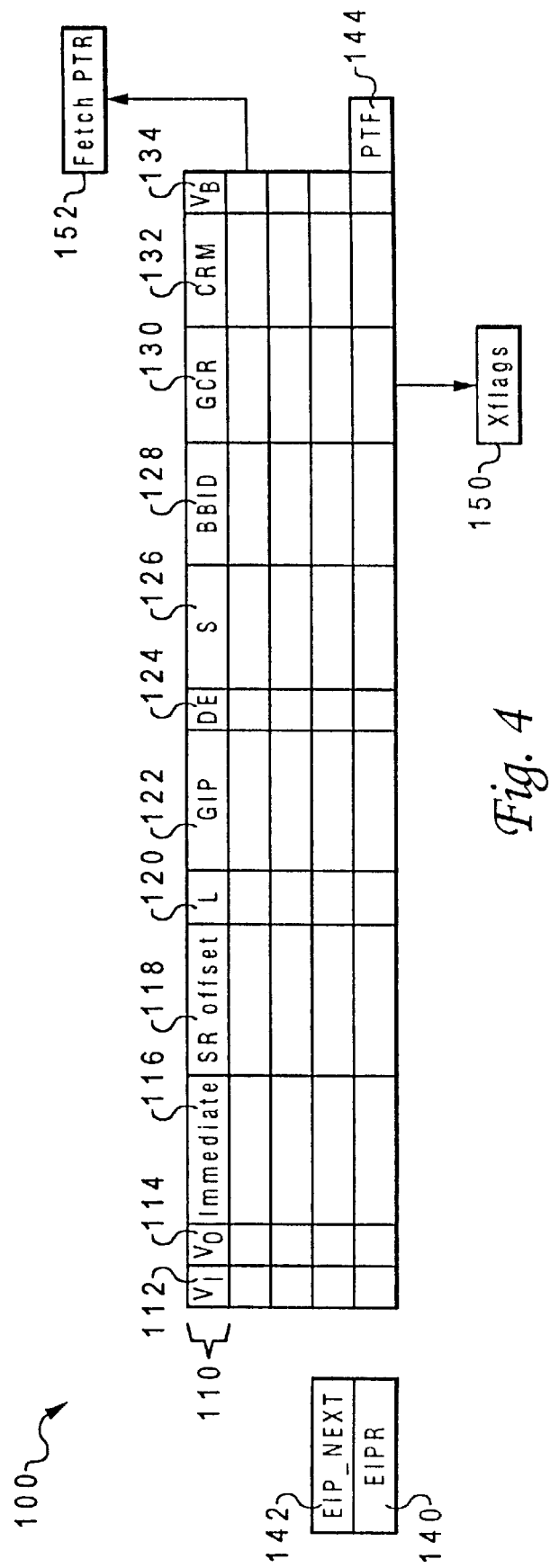
FIG. 4 illustrates a more detailed block diagram of the guest instruction queue within the EAU depicted in FIG. 3.

Referring now to FIG. 4, there is illustrated a more detailed view of guest instruction queue 100, which provides a synchronization point between the guest instruction stream and native instruction stream. As will become apparent from the following description, the provision of guest instruction queue 100 permits guest instructions emulated by CPU 4 to be pre-processed so that the latency associated with the various emulation pipeline stages can be overlapped.

In the illustrative embodiment, guest instruction queue 100 contains five entries 110, which each include the following fields 112–134:

$V_I$: indicates whether the content of immediate field 116 is valid $V_O$: indicates whether the content of SR offset field 118 is valid Immediate: stores immediate data that is specified by the guest instruction and is passed as a parameter to the corresponding semantic routine SR offset: offset between the base address of the guest instruction (which is maintained in CSBR 75) and the corresponding semantic routine L: length of semantic routine in native instructions GIP: offset pointer from CSBR 75 to guest instruction in guest address space DE: indicates whether two guest instruction queue entries (and two semantic routines) are utilized in the emulation of a single guest instruction S: indicates whether the guest instruction is in a speculative (i.e., predicted) execution path in the guest instruction stream BBID: unique basic block ID number sequentially assigned to each semantic routine from pool of BBIDs GCR: guest condition register that indicates conditions (e.g., equal/not equal) that may be utilized to predict subsequent guest branch instructions CRM: guest condition register mask that indicates which bits in the GCR field will be altered by the guest instruction $V_B$: indicates whether the semantic routine native instruction that will set the value of GCR field 130 has executed As depicted in FIG. 4, guest instruction queue 100 has an associated emulation instruction pointer register (EIPR) 140, preferably implemented as a software-accessible special purpose register (SPR), which contains the offset from the base address specified by CSBR 75 to the current guest instruction that is being interpreted. EAU 70 updates the contents of EIPR 140 in response to the execution of a newly-defined "guest dispatch completion" (gdispc) instruction in the native instruction set and in response to the execution of a guest branch instruction by guest branch unit 80 without invoking a semantic routine. Another special purpose register, emulation instruction pointer next EIP_NEXT) register 142, contains the offset from the base address specified in CSBR 75 to the next guest instruction that will be interpreted. EAU 70 updates the contents of EIP_NEXT register 142 when a gdispc instruction is executed, when a special move to SPR instruction (i.e., mtspr[EIP_NEXT]) is executed having EIP_NEXT register 142 as a target, and when a guest branch or guest NOOP instruction is emulated without invoking a semantic routine. These two offset pointers permit the state of the guest instruction stream to be easily restored following a context switch, for example, when returning from an exception. That is, by saving both the current EIP and the next EIP, the guest instruction under emulation at the time of the interrupt, which is pointed to by the current EIP, does not need to be reexecuted to compute the next EIP if both the current EIP and next EIP are saved.

Guest instruction queue 100 also has an associated predicted taken flag (PTF) 144, which indicates whether an unresolved guest branch instruction was predicted as taken and therefore whether sequential guest instructions marked as speculative (i.e., S field 126 is set) are within the target or sequential execution path.

Xflags 150 is an architected condition register for which GCR 130 in each of entries 110 is a "renamed" version. When an entry 110 is removed from the bottom of guest instruction queue 100, the bits within Xflags 150 specified by CRM 132 in that entry 110 are updated by the corresponding bit values in GCR 130. Xflags 150, GCR fields 130, CRM fields 132, and $V_B$ fields 134 (and the associated access circuitry), which are identified in FIG. 3 simply as guest flags 83, can be referenced by guest branch unit 80 to resolve guest branch instructions as described further herein below.

In cases in which each guest instruction is emulated by executing a single semantic routine, each guest instruction is allocated only a single entry 110 within guest instruction queue 100. However, in some circumstances more than one entry 110 may be allocated to a single sequential guest instruction. For example, in an embodiment in which the guest instructions are x86 instructions, many sequential guest instruction comprise two distinct portions: a first portion that specifies how the address of the sources(s) and destination of the data are determined and a second portion that specifies the operation to be performed on the data. In such cases, a first semantic routine is utilized to emulate the portion of instruction execution related to the determination of the data source and destination. addresses and a second semantic routine is utilized to emulate the portion of instruction execution related to performing an operation on the data. Accordingly, the guest instruction is allocated two entries 110 in guest instruction queue 100—a first entry containing information relevant to the first semantic routine and a second entry containing information relevant to the second semantic routine. Such dual entry guest instructions are indicated within guest instruction queue 100 by setting DE (dual entry) field 124 in the older (first) of the two entries 110. Setting the DE field ensures that both entries 110 will be retired from guest instruction queue 100 when both semantic routines have completed (i.e., in response to a gdispc instruction terminating the second semantic routine). The emulation of guest instructions utilizing two semantic routines advantageously permits some semantic routines to be shared by multiple guest instructions, thereby reducing the overall memory footprint of semantic routines 19.

The ordering of the entries 110 in guest instruction queue 100 is maintained by current entry pointer 95, which points to the oldest entry in guest instruction queue 100, and next entry pointer 97, which points to the next oldest entry. In response to a fetch or completion of a gdispc instruction, the guest instruction queue entry indicated by current entry pointer 95 is retired and both current entry pointer 95 and next entry pointer 97 are updated. Thus, entries are consumed from the "bottom" and inserted at the "top" of guest instruction queue 100.

With reference now to FIGS. 2–4, the operation of EAU 70 will now be described.

EAU INITIALIZATION

To initialize EAU 70 for emulation, the address offset to the first guest instruction to be emulated is loaded into EIP_NEXT register 142 by executing a native move to SPR (mtspr) instruction having EIP_NEXT register 142 as a target (i.e., mtspr[EIP_NEXT] in the PowerPC™ instruction set). In a preferred embodiment, this native instruction is equivalent to a guest branch always instruction since the function of such a guest branch instruction would be to load EIP_NEXT register 142 with a pointer to the next guest instruction to be executed (i.e., the offset value within CSBR 75). $V_I$ field 112 and $V_O$ field 114 of the oldest entry 110 in guest instruction queue 100 are both cleared in response to the mtspr[EIP_NEXT] instruction. Thereafter, prefetching of guest instruction from data cache 34 can be triggered utilizing a gdispc instruction.

As an aside, $V_I$ field 112 and $V_O$ field 114 of the oldest entry 110 in guest instruction queue 100 are also cleared in response to mtspr[EIP] and mtspr[CSBR] instructions, as well as when a guest branch instruction is resolved as mispredicted.

GUEST INSTRUCTION PREFETCHING

As noted above, prefetching of guest instructions from data cache 34 is triggered by placing a gdispc instruction in the native instruction stream. When fetched by sequential fetcher 36, the gdispc instruction acts as an interlock that stalls fetching by sequential fetcher 36 until $V_O$ field 114 of the oldest entry 110 in guest instruction queue 100 is set. In response to the stall of sequential fetcher 36, instruction prefetch unit 74 in EAU 70 makes a fetch request to data cache 34 for the guest instruction at the address specified by the base address and offset contained in CSBR 75.

GUEST INSTRUCTION DECODING

Guest instructions supplied by data cache 34 in response to fetch requests from instruction prefetch unit 74 are temporarily stored in instruction buffer 72 and then loaded one at a time into instruction decoder 78, which at least partially decodes each guest instruction to determine the instruction length, whether the guest instruction is a branch instruction, and the immediate data of the guest instruction, if any.

GUEST BRANCH INSTRUCTION PROCESSING

If instruction decoder 78 determines that a guest instruction is a branch instruction, the guest branch instruction is forwarded to guest branch unit 80 for processing after allocating the guest branch instruction the oldest unused entry 110 of guest instruction queue 100. (In an alternative embodiment, guest instruction ordering can be maintained without assigning guest instruction queue entries to guest branch instructions). Guest branch unit 80 first attempts to resolve a conditional guest branch instruction with reference to guest flags 83. If the bit(s) upon which the guest branch depends are set within CRM field 132 and $V_B$ field 134 is marked valid in the entry 110 corresponding to the immediately preceding sequential guest instruction, guest branch unit 80 resolves the guest branch instruction by reference to GCR field 130 of the entry 110 of immediately preceding sequential guest instruction. If, however, the relevant bit(s) within CRM 132 in the entry 110 corresponding to the immediately preceding sequential guest instruction are not set, the guest branch instruction is resolved by reference to the newest preceding entry 110, if any, having the relevant bits set in CRM field 132 and $V_B$ field 134 marked as valid, or failing that, by reference to Xflags 150. On the other hand, guest branch unit 80 predicts (i.e., speculatively executes) a conditional guest branch instruction by reference to conventional branch history table (BHT) 82 if $V_B$ field 134 is marked invalid in the newest preceding entry 110 in which the bit(s) relevant to the guest branch are set in GCR field 130. The guest instruction at the address of the resolved or predicted execution path is thereafter fetched from data cache 34 via instruction prefetch unit 74. Further details about the processing of guest branch instructions are found in Ser. Nos. 08/934,644 and 08/934,857, which were referenced hereinabove.

SEQUENTIAL GUEST INSTRUCTION PROCESSING

If the guest instruction decoded by instruction decoder 78 is a sequential instruction, at least the oldest unused entry 110 of guest instruction queue 100 is allocated to the guest instruction. As illustrated in FIG. 3, instruction decoder 78 then stores the immediate data, if any, and the offset pointer to the guest instruction into immediate field 116 and GIP field 122, respectively, of the allocated entry 110. In response to instruction decoder 78 loading immediate data into immediate field 116, $V_I$ field 112 is set.

The sequential guest instruction is then forwarded from instruction decoder 78 to tag generation unit 90, which converts the guest instruction into a unique opcode tag. According to a preferred embodiment, different opcode tags are utilized not only to distinguish between different guest instructions, but also to distinguish between identical guest instructions that access different registers. Thus, different opcode tags are utilized for guest divide (gdiv) and guest multiply (gmult) instructions, as well as for gmult R3, R2, R1 and gmult R4, R2, R1 instructions, which target different registers. The unique opcode tag produced by tag generation unit 90 forms an index into guest cache 92 that selects a particular cache entry containing an offset utilized to determine the effective address of the semantic routine corresponding to the guest instruction.

As indicated, in the illustrative embodiment, guest cache 92 comprises a four-way set associative cache having 256 lines that each contain four 4 Kbyte entries. A miss in guest cache 92 generates a user level interrupt, which is serviced by executing semantic routine synthesis code 22. As described above, semantic routine synthesis code 22 synthesizes a semantic routine corresponding to the guest instruction from native instructions and stores the semantic routine in area 19 of memory map 14. The offset from the base address of the guest instruction to the location of the newly synthesized semantic routine is then stored in guest cache 92 for subsequent recall. Because guest instruction sets are typically fairly stable, it is typical for guest cache 92 to achieve hit rates above 99%.

In response to the semantic routine (SR) offset being located (or stored) in guest cache 92, the SR offset is stored in SR offset field 118 of the allocated entry 110, thereby causing $V_O$ field 114 to be marked as valid. By the time $V_O$ is set to signify that the content of SR offset field 118 is valid, L field 120, DE field 124, S field 126, BBID field 128, and CRM field 132 are also valid within the allocated entry 110. As noted above, GCR field 130 is indicated as valid separately by $V_B$ field 134.

When $V_O$ field 114 of the oldest entry 110 in guest instruction queue 100 is set by the processing of the first guest instruction in EAU 70 at emulation startup, the value in EIP_NEXT register 142 is transferred to EIPR 140, signifying that the oldest (i.e., first) instruction in guest instruction queue 100 is the guest instruction currently being processed. In response to this event, guest dispatch unit 94 transmits the SR offset in SR offset field 118 to sequential fetcher 36, which begins to fetch native instructions within the semantic routine corresponding to the first guest instruction. As illustrated in FIG. 4, EAU 70 tracks the guest instruction for which the semantic routine is being fetched utilizing fetch PTR 152 in guest dispatch unit 94.

SEMANTIC ROUTINE PROCESSING

Semantic routine (i.e., native) instructions that are within the standard instruction set of CPU 4 are processed by CPU 4 as described above with reference to FIG. 2. Special instructions inserted into the native instruction set to support guest instruction emulation are handled as described below.

In order to connect guest instructions into a continuous guest instruction stream, a gdispc instruction is preferably inserted at the end of each semantic routine, if the guest instructions are each represented by a single semantic routine, or at the end of the last semantic routine corresponding to the guest instruction, if the guest instruction is emulated by multiple semantic routines. The gdispc instruction is preferably defined as a special form of a native branch instruction so that when fetched from instruction cache 32 by sequential fetcher 36 a gdispc instruction is folded out of the native instruction stream and passed to BPU 38. In response to detecting the gdispc instruction, BPU 38 asserts signal line 96. Guest dispatch unit 94 responds to the assertion of signal line 96 by removing all of the entries 110 corresponding to the current guest instruction from guest instruction queue 100 and by passing the semantic routine offset stored within the next entry to sequential fetcher 36 via signal lines 98. As described above, sequential fetcher 36 then computes the effective address (EA) of the semantic routine corresponding to the next guest instruction by adding the semantic routine offset to the guest instruction's base address and fetches the semantic routine from memory for execution by CPU 4.

When multiple semantic routines are utilized to emulate a single guest instruction, semantic routines other than the final semantic routine are terminated by a "guest dispatch prolog completion" (gdispp) instruction, which is a variant of the gdispc instruction. In general, the gdispp instruction is processed like the gdispc instruction. For example, like the gdispc instruction, the gdispp instruction triggers the fetching of the next semantic routine. In addition, $V_O$ field 114 within the guest instruction queue entry 110 corresponding to the semantic routine containing a gdispp instruction must be set in order for the gdispp instruction to be executed. However, in contrast to the processing of a gdispc instruction, the completion of a gdispp instruction does not trigger the removal of an entry 110 from guest instruction queue 100 or the updating of EIPR 140 and EIP_NEXT register 142.

Another special instruction inserted into the native instruction set as a form of add instruction is the guest add immediate prolog [word or half word] (gaddpi[w,h]) instruction. The function of the gaddpi[w,h] instruction is to add the immediate data specified in the first of two guest instruction queue entries allocated to a guest instruction with the value in a specified GPR 60 and store the sum in another GPR 60. Accordingly, $V_I$ field 112 for the first entry 110 must be set in order to permit the corresponding semantic routine to execute.

A similar guest add immediate completion [word or half word] (gaddci[w,h]) instruction is utilized to add the immediate data stored in the second of two guest instruction queue entries allocated to a guest instruction with value of a specified GPR 60 and store the sum in another GPR 60. $V_I$ field 112 for the second entry 110 must be set in order for the corresponding semantic routine to execute.

INTERRUPT AND EXCEPTION HANDLING

In response to either a guest instruction or native instruction exception, a non-architected exception flag is set that disables guest instruction fetching by instruction prefetch unit 74. At a minimum, the context of the guest instruction stream is saved during interrupt/exception handling and restored upon returning from the interrupt/exception by saving the contents of EIPR 140 and EIP_NEXT register 142 in SPRs 76. As a practical matter, it is preferable to save the entire bottom entry 110 of guest instruction queue 100 in SPRs 76 in order to expedite the restart of emulation following the interrupt/exception.

Prefetching of guest instructions from data cache 34 following a return from interrupt can be triggered by the execution of either a gaddpi[w,h] instruction or gaddci[w,h] instruction, which interlocks with and stalls sequential fetcher 36 until $V_I$ field 112 of the appropriate entry 110 in guest instruction queue 100 is set. Guest instruction prefetching may also be restarted through the execution of a gdispc instruction or gdispp instruction. The execution of a gdisp[p,c] or gadd[p,c]i[w,h] instruction clears the exception flag.

CONTEXT SWITCHING EXAMPLES

A save/restore operation during the emulation of a guest instruction having a single associated guest instruction queue entry 110 can be illustrated with the following native instruction stream code:

```
gdispc v      /* end of previous semantic routine */
code1
gaddciw GPRa, GPRb
code2
gdispc w
```

When "gdispc v" is fetched by sequential fetcher 36, it causes the native instruction stream to branch to the native instruction pointed to by the SR offset in EIP_NEXT register 142. On completion of this instruction, the SR offset stored in EIP_NEXT register 142 is transferred to EIPR 140. Any exception that occurs thereafter will save the current native instruction pointer in SRR0 (Save Restore Register 0) in CPU 4 and the values of EIP_NEXT register 142 and EIPR 140 in SPRs 76. However, the context switch is handled differently depending upon whether the context switch occurs before or after the immediate data of the guest instruction has been retrieved from guest instruction queue 100.

For a context switch before "gaddciw GPRa, GPRb" (i.e., during code1), the guest instruction stream context is first restored with a mtspr [EIPR, EIP_NEXT] instruction. At this time instruction prefetch unit 74 is idle and valid fields 112 and 114 of the oldest queue entry 110 are reset. CPU 4 then resumes execution of the native instructions at the native instruction in "code1" specified by SRR0. When CPU 4 encounters "gaddciw GPRa, GPRb", sequential fetcher 36 stalls and instruction prefetch unit 74 begins fetching guest instructions at the address indicated by EIPR 140. Eventually, immediate field 116 of the oldest queue entry 110 is filled with valid immediate data and $V_I$ field 112 is marked valid. In response to $V_I$ field 112 being set, sequential fetcher 36 resumes fetching native instruction, and the immediate data in immediate field 116 of the oldest queue entry 110 becomes available for access by the semantic routine.

If the context switch occurs after "gaddciw GPRa, GPRb" (i.e., during code2), the restoration of context is handled like emulation startup. The SRR0 forces CPU 4 to resume execution of native instructions at "code2". Since the execution of native instructions in code2 doesn't require a valid data in immediate field 116 of the oldest entry 110, execution of the semantic routine is resumed without initiating a guest instruction fetch sequence. When sequential fetcher 36 encounters "gdispc w", instruction prefetch unit 74 makes a fetch request for the address indicated by EIP_NEXT register 142, thereby resuming the fetching of guest instructions.

A save/restore operation for a guest instruction having dual instruction queue entries 110 can be illustrated with the following code:

```
gdispc x      /* end of previous semantic routine */
code3
gaddpiw GPRa, GPRb
code4
gdispp y
code5
gaddciw GPRc, GPRd
code6
gdispc z
```

For this code scenario, a context switch is handled differently depending upon whether the interrupt occurs during code3, code4, code5, or code6. In each of the four cases, EIPR 140 stores an offset pointer to the address of the guest instruction corresponding to the entry 110 for which DE field 112 is set, and EIP_NEXT register 142 stores an offset pointer to the next guest instruction.

If the context switch occurs at "code3", the context of the native instruction stream is restored from SRR0 at "code3". When CPU 4 eventually executes the "gaddpiw", instruction prefetch unit 74 is prompted to fetch the immediate data for the first (prolog) semantic routine and set $V_I$ field 112 for the first of the two entries 110 allocated to the guest instruction. When "gdispp y" is executed, CPU 4 prompts instruction prefetch unit 74 to set V$_O$ field 114 (and V$_I$ field 112) in the second entry 110 (if instruction prefetch unit 74 hasn't done so already), thereby reestablishing guest instruction queue 100.

The only difference between the handling of a context switch occurring at "code4" rather than "code3" is that when the context is restored, the restoration of context prompts instruction prefetch unit 74 to initiate a guest instruction fetch when sequential fetcher 36 encounters "gdispp y". A guest instruction fetch is performed for the second semantic routine only since the information in immediate field 116 of the entry 110 for the prolog semantic routine is no longer needed.

If the context switch occurs at "code5", the signal that initiates a guest instruction fetch is triggered when CPU 4 encounters "gaddciw GPRc, GPRd". In response to fetching the guest instruction pointed to by EIPR 140, immediate field 116 of the oldest entry 110 is restored and EAU 70 marks V$_I$ field 112 valid (and V$_O$ field 114 which is not needed anymore), thereby restarting the fetching of native instructions by sequential fetcher 36.

If the context switch occurs at "code6", guest instruction queue 100 is restored just like at emulation startup, as discussed above. No signal to re-fetch the guest instruction stored at the address pointed to by EIPR 140 is sent to EAU 70. Instead, when sequential fetcher 36 encounters "gdispc z", it signals instruction prefetch unit 74 to fetch from the address specified by the offset contained in EIP_NEXT register 142.

While an illustrative embodiment of the present invention has been particularly shown and described, it will be understood by those skilled in the art that various changes in form and detail may be made therein without departing from the spirit and scope hereof. For example, while the present invention has been described with reference to embodiments in which the guest instructions emulated within CPU 4 are x86 CISC instructions, it should be understood that other guest instructions could alternatively be utilized.

What is claimed is:

1. A method of interrupt handling in a processor which has a native instruction set and emulates guest instructions within a guest instruction set, said method comprising:

in response to occurrence of an interrupt during emulation of a current guest instruction, storing an indication of a location in memory of said current guest instruction, an indication of a location in memory of a next guest instruction to be emulated, and an indication of a particular native instruction;

executing an interrupt handler and thereafter resuming emulation by executing native instructions beginning with said particular native instruction;

in response to execution of a native instruction of a first type before execution of a native instruction of a second type, fetching said current guest instruction from memory; and in response to execution of a native instruction of said second type before execution of a native instruction of said first type, fetching said next guest instruction from memory without fetching said current guest instruction.

2. The method of claim 1, wherein a native instruction of said first type requires immediate data specified by a corresponding guest instruction and a native instruction of said second type terminates emulation of a corresponding guest instruction.

3. The method of claim 1, wherein:

said step of resuming emulation by executing native instructions includes the step of fetching native instructions for execution; and said method further comprises the step of temporarily stopping said fetching of native instructions in response to detection of a native instruction of said first type among said fetched native instructions.

4. The method of claim 3, and further comprising the step of resuming fetching of native instructions in response to immediate data specified by said current guest instruction becoming available for use by a native instruction.

5. A processor which has a native instruction set and emulates guest instructions within a guest instruction set, said processor having an associated memory, said processor comprising:

means, responsive to occurrence of an interrupt during emulation of a current guest instruction, for storing an indication of a location in memory of said current guest instruction, an indication of a location in memory of a next guest instruction to be emulated, and an indication of a particular native instruction;

means for executing an interrupt handler and for thereafter resuming emulation by executing native instructions beginning with said particular native instruction;

means, responsive to execution of a native instruction of a first type before execution of a native instruction of a second type, for fetching said current guest instruction from memory; and means, responsive to execution of a native instruction of said second type before execution of a native instruction of said first type, for fetching said next guest instruction from memory without fetching said current guest instruction.

6. The processor of claim 5, wherein a native instruction of said first type requires immediate data specified by a corresponding guest instruction and a native instruction of said second type terminates emulation of a corresponding guest instruction.

7. The processor of claim 5, wherein:

said means for resuming emulation by executing native instructions includes means for fetching native instructions for execution; and said processor further comprises means for temporarily stopping said fetching of native instructions in response to detection of a native instruction of said first type among said fetched native instructions.

8. The processor of claim 7, and further comprising means for resuming fetching of native instructions in response to immediate data specified by said current guest instruction becoming available for use by a native instruction.

* * * * *

UNITED STATES PATENT AND TRADEMARK OFFICE
CERTIFICATE OF CORRECTION

PATENT NO. : 5,995,743
DATED : November 30, 1999
INVENTOR(S) : Kahle et al.

It is certified that error appears in the above-identified patent and that said Letters Patent is hereby corrected as shown below:

Column 4, line 28, please delete "10"-.

Column 7, line 62, please delete ".".

Signed and Sealed this

Sixteenth Day of January, 2001

Attest:

Q. TODD DICKINSON

Attesting Officer      Commissioner of Patents and Trademarks